United States Patent
Ji et al.

(10) Patent No.: US 10,396,693 B2
(45) Date of Patent: Aug. 27, 2019

(54) METHOD OF CONTROLLING CONSTANT CURRENT OF BRUSHLESS DC MOTOR AND CONTROLLER OF BRUSHLESS DC MOTOR USING THE SAME

(71) Applicant: LG Electronics Inc., Seoul (KR)

(72) Inventors: Jongseong Ji, Seoul (KR); Wontae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/967,670

(22) Filed: May 1, 2018

(65) Prior Publication Data

US 2018/0323736 A1    Nov. 8, 2018

(30) Foreign Application Priority Data

May 2, 2017    (KR) .................... 10-2017-0056573

(51) Int. Cl.
| | |
|---|---|
| *H02P 7/29* | (2016.01) |
| *H02P 21/00* | (2016.01) |
| *F04D 25/06* | (2006.01) |
| *F04D 27/00* | (2006.01) |
| *F24C 15/20* | (2006.01) |
| *H02P 6/18* | (2016.01) |
| *H02P 21/24* | (2016.01) |

(52) U.S. Cl.
CPC ............ *H02P 7/2913* (2013.01); *F04D 25/06* (2013.01); *F04D 27/004* (2013.01); *H02P 21/00* (2013.01); *F24C 15/20* (2013.01); *H02P 6/18* (2013.01); *H02P 21/24* (2016.02); *H02P 2205/01* (2013.01)

(58) Field of Classification Search
CPC ........................... H02P 21/00; H02P 2205/01
See application file for complete search history.

(56) References Cited

U.S. PATENT DOCUMENTS 5,847,597 A * 12/1998 Ooishi .................. G11C 5/143
                                                    327/543
2015/0233380 A1    8/2015 Sasaki et al.

FOREIGN PATENT DOCUMENTS

CN    103123124 A    5/2013
CN    203215744 U    9/2013
(Continued)

OTHER PUBLICATIONS

European Search Report in European Application No. 18170309.1, dated Oct. 9, 2018, 10 pages.

*Primary Examiner* — Karen Masih
(74) *Attorney, Agent, or Firm* — Fish & Richardson P.C.

(57) ABSTRACT

A method for controlling a brushless direct current (BLDC) motor is disclosed. The method includes: receiving a constant current; comparing the constant current to a reference current; based on the comparison revealing that the constant current is smaller than the reference current, providing a first speed command to the rotational speed control unit to increase a speed of the BLDC motor; based on the comparison revealing that the constant current is larger than the reference current, providing a second speed command to the rotational speed control unit to decrease a speed of the BLDC motor; based on the comparison revealing that the constant current is the same as the reference current, providing a third speed command to the rotational speed control unit to maintain a speed of the BLDC motor; and controlling, by the rotational speed control unit, a speed of the BLDC motor.

20 Claims, 5 Drawing Sheets

(56) References Cited

FOREIGN PATENT DOCUMENTS

| DE | 112015001978 T5 | 3/2017 |
| JP | 2004274989 A | 9/2004 |
| KR | 2017042042 A | 4/2017 |

* cited by examiner

METHOD OF CONTROLLING CONSTANT CURRENT OF BRUSHLESS DC MOTOR AND CONTROLLER OF BRUSHLESS DC MOTOR USING THE SAME

CROSS-REFERENCE TO RELATED APPLICATION

This application claims priority to and the benefit of Korean Patent Application No. 10-2017-0056573, filed on May 2, 2017, the disclosure of which is incorporated herein by reference in its entirety.

TECHNICAL FIELD

The present invention relates to a brushless direct current (BLDC) motor, and more particularly, to a method of controlling a constant current of a BLDC motor capable of significantly increasing airflow relative to a pressure by receiving a constant current of a BLDC motor as feedback and controlling a rotational speed of the BLDC motor, and a controller of a BLDC motor using the same.

BACKGROUND

Generally, a cooking table on which a heating device such as an electric heater or a gas range for cooking such as boiling or baking through an application of high-temperature heat to food is disposed is provided in a kitchen.

In this case, in a process of heating food to be cooked which is heated by a high temperature of the heating device disposed on the cooking table, contaminants such as smoke, odor, oil vapor, and the like are generated. Such contaminants may float due to the heat and diffuse throughout a kitchen or an entire room, and the diffused contaminants provide an unpleasant odor which causes aversion. Specifically, in a closed kitchen, these contaminants become factors that degrade the concentration of workers and harm the health of the workers.

Accordingly, a range hood for discharging contaminants such as smoke, odor, oil vapor, and the like which are generated when food is cooked to the outdoors is provided in a kitchen.

Such a range hood may include a main body which forms an exterior of the range hood, a fan which sucks air into the main body and generates airflow for discharging the air to the outside, a filter which is installed in the main body and filters the air sucked into the main body, and a pipe or duct which forms a path for discharging the air sucked into the main body through the filter to the outside.

Since a predetermined power is supplied to an alternating current (AC) motor used in a conventional fan for each airflow mode, it is impossible to control a rotational speed of a fan. Conversely, a brushless direct current (BLDC) motor has an advantage in that a rotational speed of a fan may be controlled.

In the case of a conventional BLDC motor, initially, the motor was controlled by a method of controlling a rotational speed at a constant speed for each airflow mode. However, in the case of a rotational speed control method (i.e., a so-called revolutions per minute (RPM) control method), when there is a flow resistance (a load) in an outlet of a hood, airflow generated in the hood is decreased even when the fan rotates at the same rotational speed.

Specifically, in the case of the RPM control method, airflow generated by the BLDC motor may be greater than airflow generated by an AC motor when there is little flow resistance in the outlet of the fan. However, when a flow resistance of a certain level or more is generated, use of the AC motor results in greater airflow (see FIG. 4).

In consideration of the above characteristics, by applying a method of controlling a fixed current in a BLDC motor, it is possible to control airflow to be the same as or greater than that of an AC motor even when high or low flow resistance is generated in an outlet of a fan. However, in this case, since there is no difference in efficiency of airflow generation between an AC motor and a BLDC motor (see FIG. 4) as the flow resistance in an outlet of a fan is increased, it is unnecessary to apply a BLDC motor which requires complicated control thereto.

Meanwhile, an airflow mode of a range hood is set to generate airflow intended by range hood designers. The airflow is determined in consideration of a structure of a main body, a fan, and a filter constituting a product. However, a structure of a duct behind the fan of the range hood may not be controlled by the designers of the range hood. Therefore, when an installation structure or environment of the range hood is changed (i.e., when the range hood is installed in another apartment or the like), the airflow intended by the designers is not generated in the airflow mode of the range hood installed in the corresponding environment and this may lead to a degradation of performance of the product.

Therefore, even when the installation environment of the range hood is changed, the BLDC motor should be controlled to generate the airflow intended by the designers so that the range hood may efficiently operate to meet the designed intention thereof. Also, these characteristics are not limited to the range hood.

SUMMARY

The present invention is directed to a method of controlling a brushless direct current (BLDC) motor capable of increasing airflow generated by a fan even when a flow resistance of an outlet of the fan increases, and a controller of a BLDC motor using the same.

Further, the present invention is directed to a method of controlling a rotational speed of a BLDC motor so that a constant current of the BLDC motor maintains a reference current of a corresponding airflow mode, and a controller of a BLDC motor using the same.

Further, the present invention is directed to a method of controlling a BLDC motor for entering an airflow mode capable of preventing a speed fluctuation (i.e., a phenomenon in which a speed is repeatedly increased and decreased) that can occur when a rotational speed of the motor is controlled by a method of maintaining a constant current of a BLDC motor, and a controller of a BLDC motor using the same.

According to an aspect of the present invention, there is provided a method of controlling a BLDC motor including comparing a constant current (Iqse) of an output port of a BLDC motor (16) to a reference current (Istd), as a result of the comparison, applying an increase speed command ($\omega^*m$) to a rotational speed control unit (10) when the constant current is lower than the reference current, applying a decrease speed command to the rotational speed control unit when the constant current is higher than the reference current, and maintaining and applying the same speed command to the rotational speed control unit when the constant current is the same as the reference current, and controlling, by the rotational speed control unit, a speed of the BLDC motor according to the applied speed commands.

The reference current may have a preset value corresponding to each of multi-stage airflow modes.

The speed commands may be applied to the rotational speed control unit after present speed ($\omega m$) of the BLDC motor is fed back thereto.

The rotational speed control unit may include a speed controller (11) and a current controller (12), the speed command may be applied to the speed controller, and the speed controller may apply a current command (I*qse) corresponding to the applied speed command to the current controller.

The current command may be applied to the current controller after the constant current of the output port of the BLDC motor is fed back thereto.

The method may further include, in a process of entering a higher speed airflow mode than a present airflow mode, obtaining an instant speed of the BLDC motor at a time point at which the constant current of the output port of the BLDC motor exceeds an entering reference current of a corresponding airflow mode, and applying the obtained instant speed to the rotational speed control unit as a speed command and completing a process of entering the corresponding airflow mode.

The entering reference current may have a higher value than a preset reference current of the corresponding airflow mode.

The instant speed of the BLDC motor may be obtained using a sensorless method.

According to another aspect of the present invention, there is provided a controller of a BLDC motor including a BLDC motor (16), a constant current control unit (20) configured to receive a constant current (Iqse) of an output port of the BLDC motor as an input, compare the constant current to a reference current (Istd), output an increase speed command ($\omega$*m) when the constant current is lower than the reference current, output a decrease speed command when the constant current is higher than the reference current, and maintain and output the same speed command when the constant current is the same as the reference current, and a rotational speed control unit (10) including a speed controller (11) configured to receive the speed command output from the constant current control unit as an input, and generate a current command (I*qse) for controlling a rotational speed of the BLDC motor.

A command in which a present speed ($\omega m$) of the BLDC motor is fed back to the speed command output from the constant current control unit may be input to the speed controller.

The controller of the BLDC motor may further include a motor sensor (18) configured to receive a voltage and current of an input end of the BLDC motor (16) and a voltage and current of the output port thereof and output values of current rotational angular position ($\theta m$) and rotational speed ($\omega m$) of the BLDC motor, wherein the rotational speed output from the motor sensor may be fed back to the speed command output from the constant current control unit.

In a process of entering a higher speed airflow mode than a present airflow mode, the constant current control unit may obtain an instant speed of the BLDC motor at a time point at which the constant current of the output port of the BLDC motor exceeds an entering reference current of a corresponding airflow mode, apply the obtained instant speed to the rotational speed control unit as the speed command, and enter the corresponding airflow mode.

The entering reference current may have a higher value than a preset reference current of the corresponding airflow mode.

BRIEF DESCRIPTION OF THE DRAWINGS

The above and other objects, features and advantages of the present invention will become more apparent to those of ordinary skill in the art by describing exemplary implementations thereof in detail with reference to the accompanying drawings, in which.

DETAILED DESCRIPTION

Hereinafter, exemplary implementations of the present invention will be described in detail with reference to the accompanying drawings.

The present invention is not limited to the implementations to be disclosed, and may be implemented in various different forms. The implementations are provided in order to fully explain the present invention and the scope of the present invention to those skilled in the art.

[Rotational Speed Control Unit]

Figure 1:
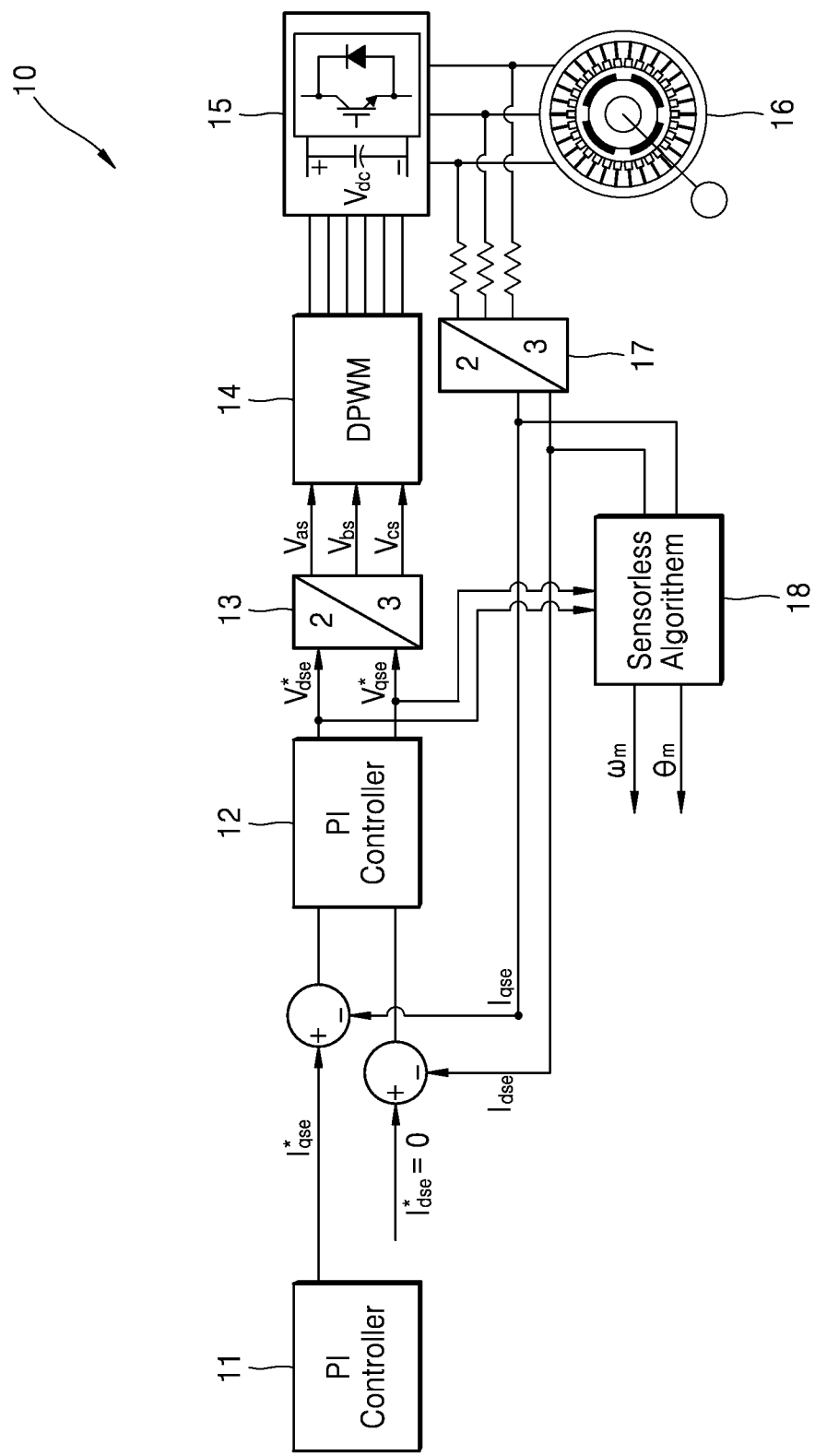
FIG. 1 is a control block diagram illustrating a brushless direct current (BLDC) motor rotational speed control algorithm.

FIG. 1 is a diagram illustrating a brushless direct current (BLDC) motor rotational speed control algorithm. Referring to FIG. 1, a rotational speed of a BLDC motor 16 is controlled by a rotational speed control unit 10. That is, the rotational speed control unit 10 controls the BLDC motor to rotate the BLDC motor at a desired speed. The rotational speed control unit 10 includes a speed controller 11 and a current controller 12. In some implementations, the speed controller 11 and the current controller 12 can be proportional integral controllers.

A value of a q-axis current command I*$_{qse}$ corresponding to the rotational speed of the BLDC motor 16 is mapped in the rotational speed control unit 10. The current command is generated by a speed controller 11. The current command generated by the speed controller 11 is input to a current controller 12 after a value of a q-axis constant current I$_{qse}$ output from an output port of the BLDC motor 16 is fed back thereto. After a value of a d-axis constant current I$_{dse}$ output from the output port of the BLDC motor is fed back to a d-axis command current I*$_{dse}$ having a value of 0, the d-axis command current I*$_{dse}$ is also input to the current controller 12.

The current controller 12 receives the current commands, to which the constant currents are fed back, as inputs to generate a d-axis command voltage V*$_{dse}$ and a q-axis command voltage V*$_{qse}$, and the d-axis command voltage V*$_{dse}$ and the q-axis command voltage V*$_{qse}$ are input to a two-phase-to-three-phase converter 13.

The two-phase-to-three-phase converter 13 converts a two-phase command voltage into a three-phase command voltage and inputs the converted three-phase command voltage to a digital pulse width modulation (DPWM) control unit 14. The DPWM control unit 14 controls switching of an inverter 15 corresponding to the above input and controls the BLDC motor 16.

A motor sensor 18, which estimates a rotational angular position and rotational speed of a motor using a sensorless algorithm, compares a current and voltage detected in the BLDC motor to a current and voltage output from the current controller 12, and estimates and outputs a current rotational angular position θm and a current rotational speed ωm of the motor.

The current rotational speed of the motor output from the motor sensor is continuously monitored, and thus the value of the q-axis current command $I^*_{qse}$ output from the speed controller 11 is determined by the current rotational speed of the motor.

[Constant Current Control Unit]

When a rotational speed of the BLDC motor 16 is controlled by only the above-described rotational speed control unit 10, a rotational speed of a motor which rotates a fan may be constantly maintained at a target rotational speed. However, when a flow resistance in an outlet of a duct or the like located behind the fan according to an installation environment of a range hood or the like is large, airflow generated by the fan is decreased even though the rotational speed of the motor is maintained (see ① of a pressure quantity (PQ) diagram in FIG. 4). That is, the fan rotates, but required airflow designed by designers is not generated.

In such a situation, although a rotational speed of the fan is maintained, a phenomenon in which the constant current of the BLDC motor is decreased occurs since work that the fan does to generate the airflow decreases. Therefore, in order to prevent the airflow from decreasing even when a discharge resistance increases, it is necessary to increase the rotational speed of the fan and increase work that the BLDC motor does to generate the airflow by controlling the BLDC motor so that the constant current does not decrease.

According to the present invention, an example in which a constant current is controlled in a closed loop, that is, is feedback-controlled will be described.

Figure 2:
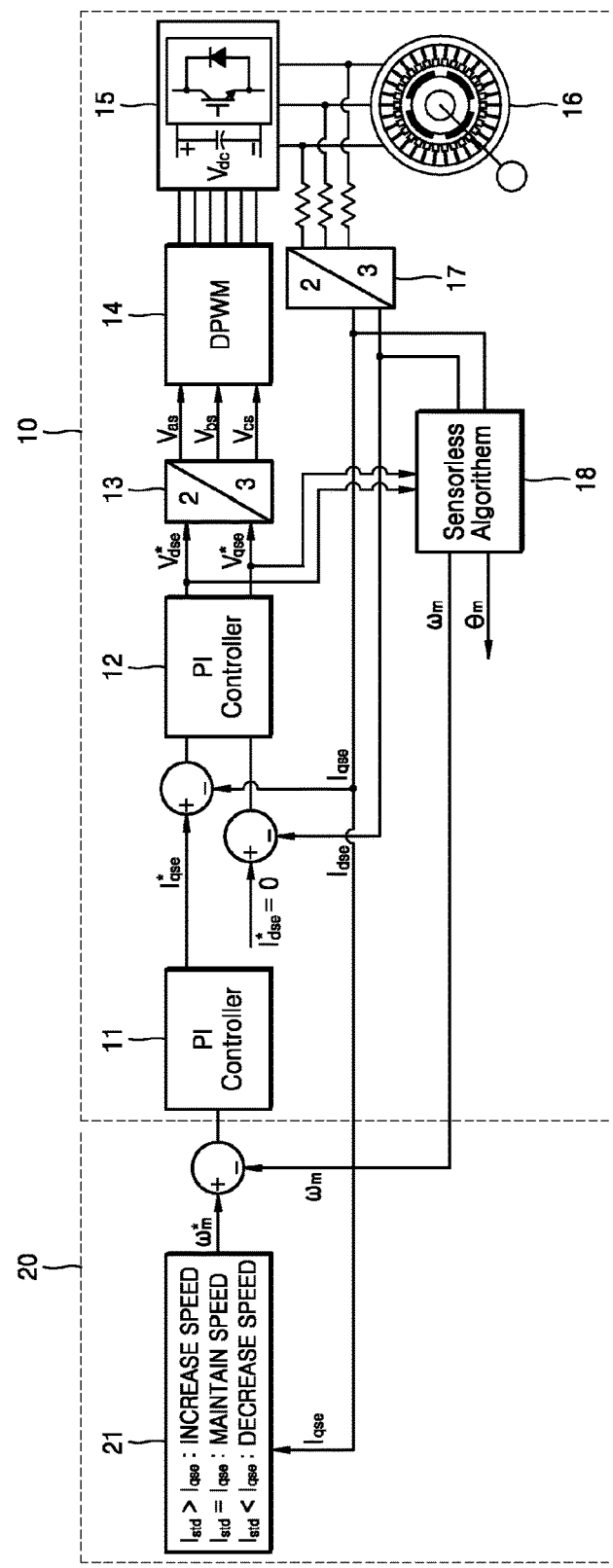
FIG. 2 is a control block diagram illustrating a BLDC constant current constant control algorithm.
Figure 3A:
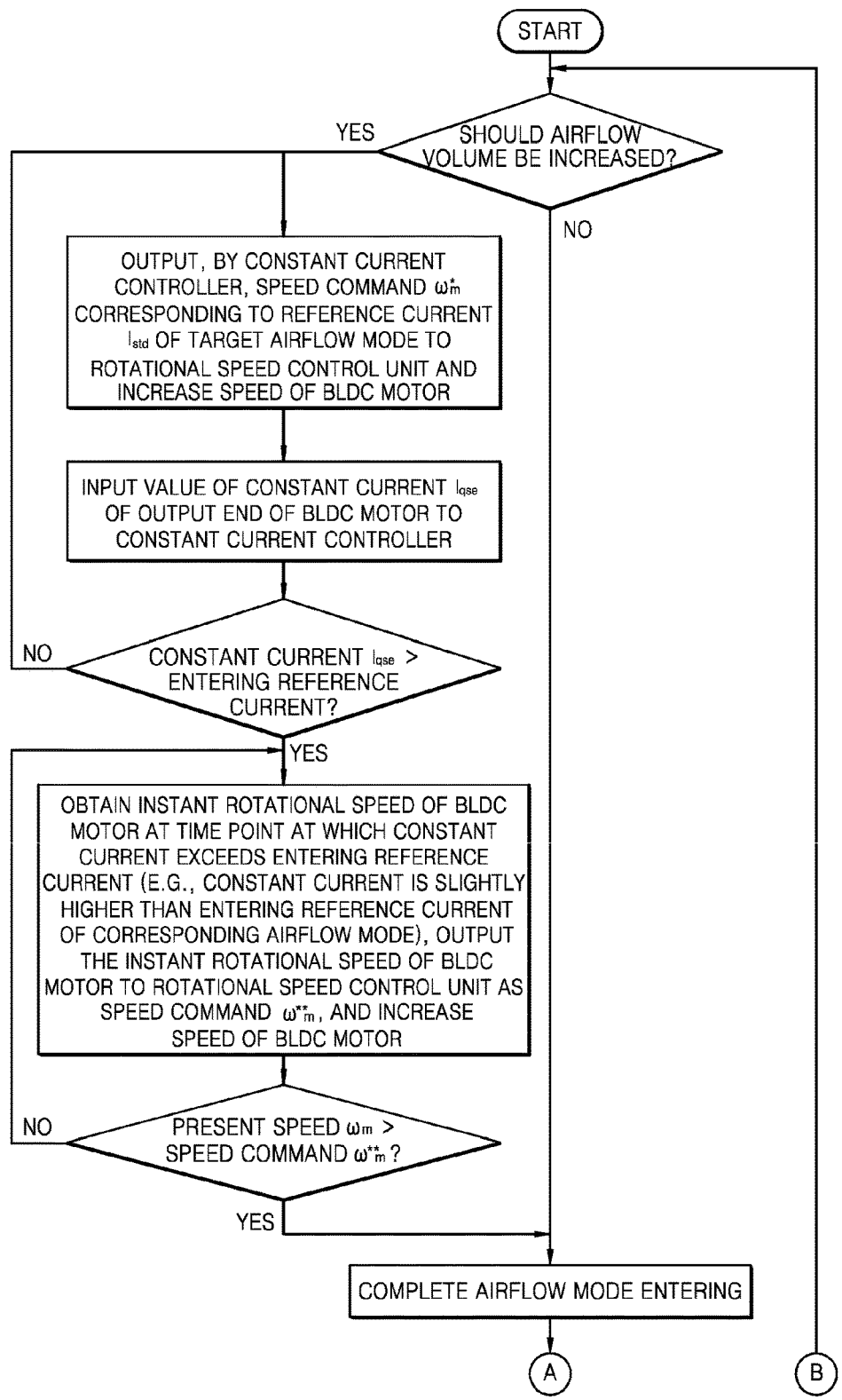
FIGS. 3A and 3B are flowcharts illustrating a process of controlling a BLDC motor according to the present invention.
Figure 3B:
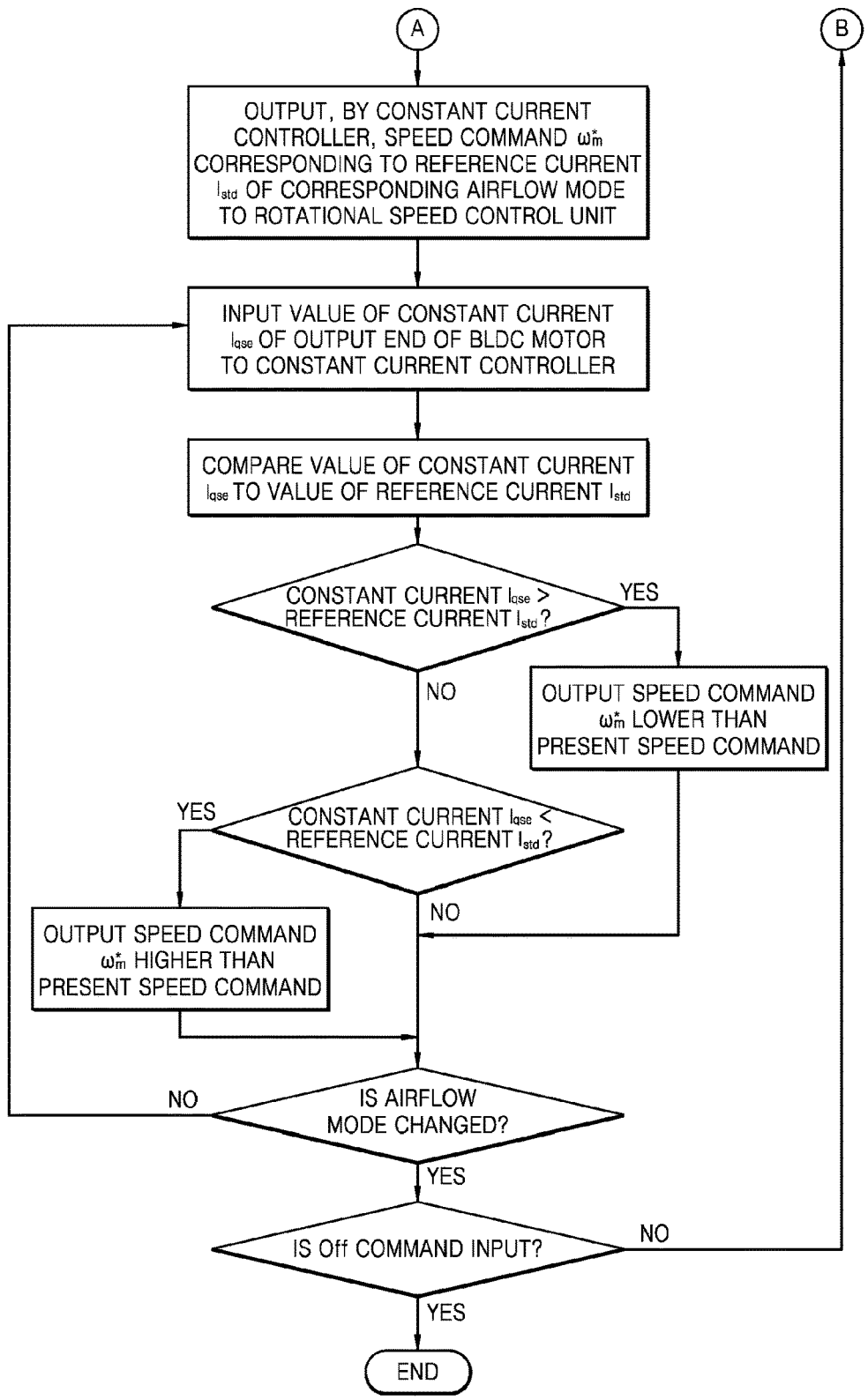

FIG. 2 is a control block diagram illustrating a BLDC constant current constant control algorithm, and FIGS. 3A and 3B are flowcharts illustrating a process of starting a BLDC motor according to the present invention. In FIG. 2, in relation to FIG. 1, a BLDC motor includes the rotational speed control unit 10 of the BLDC motor illustrated in FIG. 1 and further includes a constant current control unit 20 which continuously receives a value of a constant current $I_{qse}$ of the BLDC motor 16 and outputs a rotational speed command ω*m of the BLDC motor to the rotational speed control unit 10 based on the value of the constant current $I_{qse}$.

Compared to the case in which the rotational speed control unit 10 independently controls the BLDC motor 16 at a rotational speed designated according to a mapping value for each operational mode, when the constant current control unit 20 controls the BLDC motor together with the rotational speed control unit 10, a rotational speed of the BLDC motor 16 is controlled so that a constant current of the BLDC motor 16 becomes constant. In the constant current control unit 20, a reference current required for each airflow mode is set. That is, it may be understood that a higher reference current is set for a higher airflow mode.

Referring to FIG. 2, a constant current controller 21 of the constant current control unit 20 compares a current constant current $I_{qse}$ of the BLDC motor to a reference current $I_{std}$ that is required for a corresponding airflow mode of multiple airflow modes for a fan. The constant current controller 21 outputs the rotational speed command ω*m to the speed controller 11 of the rotational speed control unit 10 according to the comparison result.

A present speed of the BLDC motor is fed back to the speed command of the constant current controller 21, and the speed command of the constant current controller 21 is input to the speed controller 11 of the rotational speed control unit 10. The speed controller 11 controls the BLDC motor 10 so that the BLDC motor rotates based on the rotational speed input from the constant current controller 21.

Referring to a method of controlling a BLDC motor in detail with reference to FIGS. 2 and 3B as an implementation of the present invention, a value of the constant current $I_{qse}$ of an output port of a BLDC motor is continuously provided to the constant current controller 21 of the constant current control unit 20. The constant current controller 21 compares the provided value of the constant current to the reference current $I_{std}$ of a corresponding airflow mode.

As a result of the comparison, when the constant current is the same as the reference current (i.e., when intended airflow is generated), the present speed command is constantly maintained, when the constant current is less than the reference current (i.e., when less than the intended airflow is generated), an increase speed command is output, and when the constant current exceeds the reference current (i.e., when more than the intended airflow is generated), a decrease speed command is output.

Also, the rotational speed control unit 10 controls the rotational speed of the BLDC motor based on the speed command. Even in the controlling process of the motor, the value of the constant current $I_{qse}$ of the output port of the BLDC motor is continuously provided to the constant current controller 21 of the constant current control unit 20 so that the feedback-control is continued.

Figure 4:
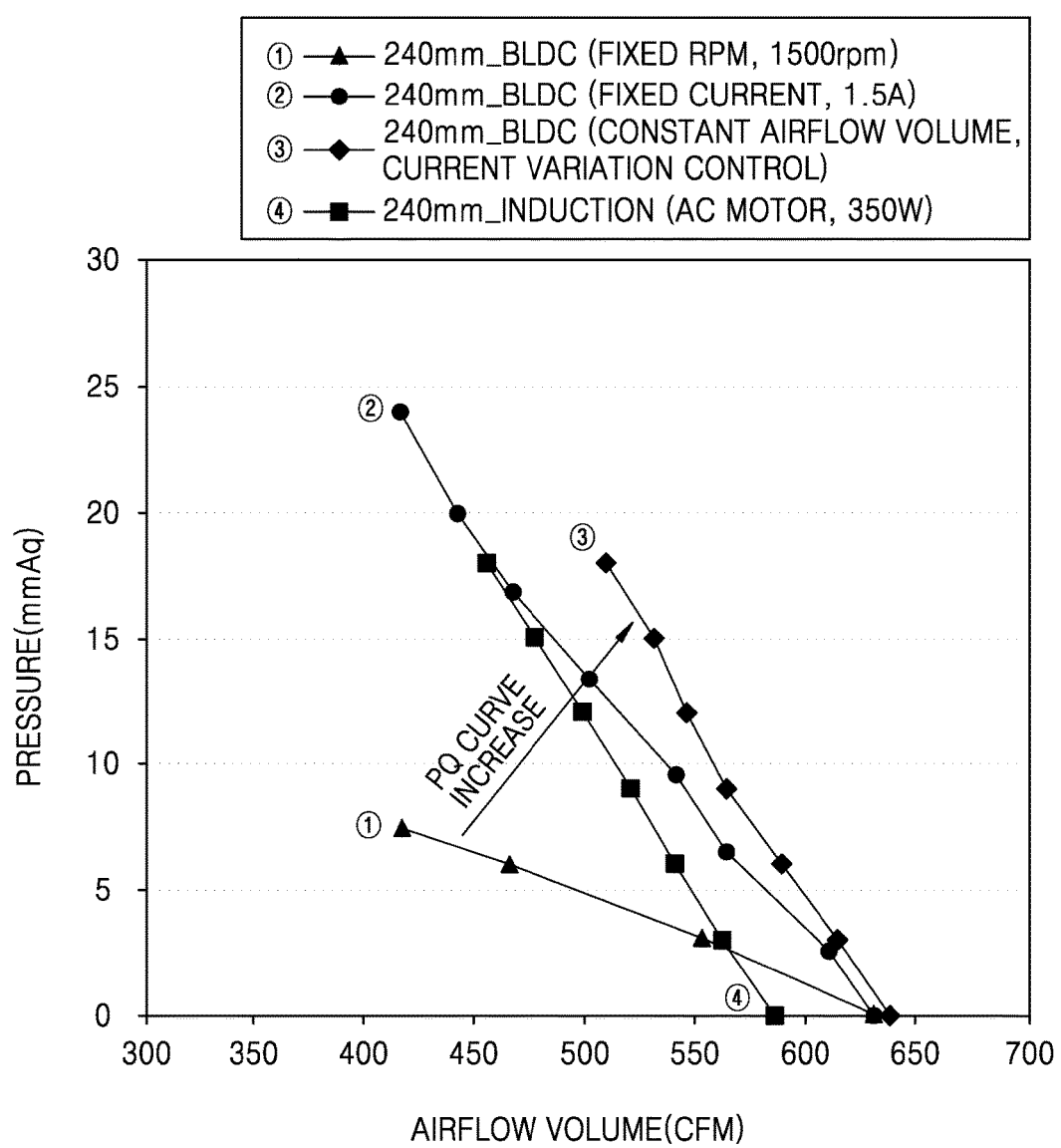
FIG. 4 is a graph illustrating experimental results illustrating a relationship between a static pressure and airflow in the cases of controlling rotational speed of a BLDC motor to be fixed, controlling current of a BLDC motor to be fixed, controlling airflow of a BLDC motor is fixed, and using an alternating current (AC) motor.

Such a feedback-control method corresponds to a current variation control since a target rotational speed of the BLDC motor may be continuously changed to maintain the constant current. Effects of increasing the airflow according to the current variation control are illustrated in FIG. 4. That is, compared to the case in which the rotational speed of the BLDC motor is controlled by only the rotational speed control unit 10 (see ① of FIG. 4), when the current variation control for constantly maintaining the constant current is performed as in the present invention (see ③ of FIG. 4), it may be confirmed that a discharge resistance is increased, and thus the largest airflow is generated even when a static pressure increases.

It may be confirmed that, compared to the case in which the rotational speed of the BLDC motor is controlled by supplying a fixed current to the BLDC motor (see ② of FIG. 4), there is a better airflow generation effect. That is, a value of a current required to further increase the airflow may vary according to a static pressure. Since such a requirement may not be satisfied when the BLDC motor is controlled by a fixed current being supplied thereto, it may be understood that less than required airflow is generated. That is, a PQ diagram illustrated in of FIG. 4 may be obtained when the constant current control unit 20 and the rotational speed control unit 10 are used together as described above.

Meanwhile, the reference current $I_{std}$ is preferably set to be a numerical range and not to be a certain value of a corresponding airflow mode. The reference range is preferably set so that a variation of the constant current in each airflow mode is minimized.

Although an example in which the motor sensor using the sensorless algorithm is used is illustrated in the above-described implementations, the method of controlling a BLDC motor of the present invention may be applied even though various types of other motor sensors such as an encoder and the like are applied.

[Airflow Mode Entering Process Control]

The airflow mode control described above relates to control after entering an airflow mode. However, when using a motor sensor using a sensorless algorithm, the algorithm is significantly accurate after entering an airflow mode but may have a factor that is somewhat unstable during control in a process of entering the airflow mode. Specifically, when the airflow mode is changed in a direction in which airflow increases, there is a concern about a speed fluctuation when using the sensorless algorithm.

In the present invention, the airflow mode entering process control illustrated in FIG. 3A is additionally performed to remove the speed fluctuation phenomenon. First, when the airflow mode is changed by a user, a timer, or the like, whether a corresponding change command is for increasing or decreasing the airflow is determined. When the airflow mode is changed in a direction in which the airflow decreases, problems such as a speed fluctuation and the like do not occur, and thus the process enters the constant current control process (see FIG. 3B) described above. That is, the speed of the BLDC motor is lowered by performing the constant current control described above based on the reference current $I_{std}$ corresponding to the lowered airflow mode.

Meanwhile, when the airflow mode is changed in the direction in which the airflow increases, the constant current controller 21 outputs a speed command corresponding to the changed reference current $I_{std}$ of the corresponding airflow mode or an entering reference current, which is set to be slightly higher than the reference current $I_{std}$ of the corresponding airflow mode, to increase the speed of the BLDC motor. Even in this process, the value of the constant current $I_{qse}$ of the BLDC motor is also continuously provided to the constant current controller 21.

When the airflow mode is changed in the direction in which the airflow increases, whether the constant current exceeds the entering reference current, which is set to be slightly higher than the reference current of the corresponding airflow mode, is determined. In a state in which the constant current is not yet more than the entering reference current, the control of the BLDC motor is continued to continuously increase the speed thereof.

As a result of the motor control through which the speed is increased, when the constant current of the output port of the motor exceeds the entering reference current, the constant current control unit 20 obtains a rotational speed of the BLDC motor at a time point at which the constant current exceeds the entering reference current. The constant current control unit 20 outputs the obtained rotational speed to the rotational speed control unit 10 as a speed command $\omega^{**}_m$ for entering the airflow mode.

As a result of the control of the rotational speed control unit 10 based on the speed command $\omega^{**}_m$ for entering the airflow mode, when it is determined that the instant speed of the BLDC motor exceeds the speed command for entering the airflow mode, the entering of the airflow mode is finally completed. After the entering of the airflow mode is completed, the control illustrated in FIG. 3B is continued.

The control of the airflow mode entering process is because a speed fluctuation phenomenon in which the entering of the airflow mode is performed without any problem when the airflow mode is lowered, but the airflow mode does not stably reach the increased airflow mode when the airflow mode is increased. That is, in the above-described airflow mode entering process control, after the rotational speed of the BLDC motor is raised to a higher temporary airflow mode than a target airflow mode, the BLDC motor is controlled again in the target airflow mode (having a lower airflow than in the temporary airflow mode), and thus the speed fluctuation phenomenon may be addressed.

In the control method of a controller of a BLDC motor of the present invention, since a BLDC constant current constant control algorithm is used, airflow is hardly decreased even when there is a flow resistance in an outlet of a fan rotated by the BLDC motor.

Accordingly, even when the fan rotated by the BLDC motor is installed in an environment in which a flow resistance inevitably varies, a designed airflow can be generated.

Such a control method can be applied to all multi-stage airflow modes only by setting a reference current of each of the airflow modes and controlling a rotational speed to match the constant current of the BLDC motor to a corresponding reference current.

Also, since the control method of the present invention can prevent a speed fluctuation phenomenon (i.e., a so-called chattering phenomenon) which occurs during an airflow mode changing process, specifically, a speed increasing process, the BLDC motor can stably operate.

In addition to the effects described above, specific effects of the present invention have been described in the above detailed description of the implementations of the invention.

While the present invention has been described with reference to the illustrated drawings thereof, the present invention is not limited to the disclosed implementations and the drawings. It should be clear to those skilled in the art that various modifications within the scope of the invention may be made. In addition, although operational effects according to the configuration of the present invention were not explicitly described while explaining the implementations of the present invention, it should be appreciated that effects predictable through the corresponding configuration can also obtained.

What is claimed is:

1. A method for controlling a brushless direct current (BLDC) motor, the method comprising:
   receiving a constant current from an output port of the BLDC motor;
   comparing the constant current to a reference current;
   based on the comparison of the constant current to the reference current, providing at least one speed command to a rotational speed control unit, wherein providing the at least one speed command comprises:
      based on the comparison revealing that the constant current is smaller than the reference current, providing a first speed command to the rotational speed control unit, the first command being configured to increase a speed of the BLDC motor,
      based on the comparison revealing that the constant current is larger than the reference current, providing a second speed command to the rotational speed control unit, the second command being configured to decrease a speed of the BLDC motor, and
      based on the comparison revealing that the constant current is the same as the reference current, providing a third speed command to the rotational speed control unit, the third command being configured to maintain a speed of the BLDC motor; and based on the at least one speed command, controlling, by
the rotational speed control unit, a speed of the BLDC
motor.

2. The method of claim 1, wherein the BLDC motor is configured to drive a fan that operates in a plurality of airflow modes, and
wherein the reference current is selected from among a plurality of preset values, each of the plurality of preset values corresponding to a respective airflow mode of the plurality of airflow modes for the fan.

3. The method of claim 1, further comprising:
determining a present speed of the BLDC motor;
adjusting the at least one speed command based on the present speed; and
controlling, by the rotational speed control unit, a speed of the BLDC motor based on the adjusted speed command.

4. The method of claim 1, wherein the rotational speed control unit includes a speed controller and a current controller, the method further comprising:
receiving, by the speed controller, the at least one speed command;
generating, by the speed controller, a current command based on the at least one speed command; and
controlling, by the current controller, a speed of the BLDC motor based on the current command.

5. The method of claim 4, further comprising:
adjusting the current command based on the constant current that is received from the output port of the BLDC motor; and
controlling, by the current controller, a speed of the BLDC motor based on the adjusted current command.

6. The method of claim 1, wherein the BLDC motor is configured to drive a fan that operates in a plurality of airflow modes, and
wherein, based on the fan changing from a current airflow mode into a first airflow mode in which a speed of the BLDC motor is higher than a speed of the BLDC motor in the current airflow mode, the method further comprises:
determining a first speed of the BLDC motor at a time point at which the constant current satisfies a first preset value of the reference current, the first preset value corresponding to the first airflow mode, and
providing the first speed to the rotational speed control unit as the at least one speed command such that the rotational speed control unit controls a speed of the BLDC motor based on the first speed.

7. The method of claim 6, wherein the first preset value of the reference current is larger than a preset value of the reference current corresponding to the current airflow mode.

8. The method of claim 6, wherein determining the first speed of the BLDC motor comprises determining the first speed of the BLDC motor using a sensorless method.

9. The method of claim 8, wherein the rotational speed control unit includes a current controller that is configured to control a speed of the BLDC motor, the sensorless method comprising:
receiving a first current and a first voltage from the BLDC motor,
receiving a second current and a second voltage from an output port of the current controller,
comparing the first current and the first voltage to the second current and the second voltage,
based on the comparison of the first current and the first voltage to the second current and the second voltage, determining the first speed of the BLDC motor.

10. The method of claim 9, wherein the current controller is a proportional integral controller.

11. A controller comprising:
a BLDC motor;
a constant current control unit that is configured to:
receive a constant current from an output port of the BLDC motor,
compare the constant current to a reference current,
based on the comparison of the constant current to the reference current, generate at least one speed command:
based on the comparison revealing that the constant current is smaller than the reference current, generate a first speed command that is configured to increase a speed of the BLDC motor,
based on the comparison revealing that the constant current is larger than the reference current, generate a second speed command that is configured to decrease a speed of the BLDC motor, and
based on the comparison revealing that the constant current is the same as the reference current, generate a third speed command that is configured to maintain a speed of the BLDC motor; and
a rotational speed control unit that is configured to:
receive the at least one speed command, and
based on the at least one speed command, control a speed of the BLDC motor.

12. The controller of the BLDC motor of claim 11, wherein the BLDC motor is configured to drive a fan that operates in a plurality of airflow modes, and
wherein the reference current is selected from among a plurality of preset values, each of the plurality of preset values corresponding to a respective airflow mode of the plurality of airflow modes for the fan.

13. The controller of the BLDC motor of claim 11, wherein the constant current control unit is configured to adjust the at least one speed command based on a present speed of the BLDC motor, and
wherein the rotational speed control unit includes a speed controller that is configured to control a speed of the BLDC motor based on the adjusted speed command.

14. The controller of claim 13, further comprising:
a motor sensor that is configured to:
receive a first current and a first voltage from an input port of the BLDC motor and a second current and a second voltage from the output port of the BLDC motor;
based on the first current, the first voltage, the second current, and the second voltage, determine a current rotational angular position and a current rotational speed of the BLDC motor.

15. The controller of claim 14, wherein the current rotational speed of the BLDC motor is combined with the at least one speed command from the constant current control unit to generate an input to the rotational speed control unit.

16. The controller of claim 14, wherein the BLDC motor is configured to drive a fan that operates in a plurality of airflow modes, and
wherein, based on the fan changing from a current airflow mode into a first airflow mode in which a speed of the BLDC motor is higher than a speed of the BLDC motor in the current airflow mode, the constant current control unit is configured to:
determine a first speed of the BLDC motor at a time point at which the constant current satisfies a first preset value of the reference current, the first preset value corresponding to the first airflow mode, and provide the first speed to the rotational speed control unit as the at least one speed command such that the rotational speed control unit controls a speed of the BLDC motor based on the first speed.

17. The controller of claim 16, wherein the first preset value of the reference current is larger than a preset value of the reference current corresponding to the current airflow mode.

18. The controller of claim 11, wherein the rotational speed control unit includes:
   a speed controller that is configured to receive the at least one speed command and generate a current command based on the at least one speed command, and
   a current controller that is configured to control a speed of the BLDC motor based on the current command.

19. The controller of the BLDC motor of claim 18, wherein the current command is adjusted based on the constant current that is received from the output port of the BLDC motor.

20. The controller of claim 18, wherein the current controller is a proportional integral controller.

* * * * *